US012734862B2

(12) United States Patent
Ueda et al.

(10) Patent No.: US 12,734,862 B2
(45) Date of Patent: Sep. 15, 2026

(54) METHOD OF PRODUCING METAL COMPONENT-ATTACHED VEHICLE WINDOW

(71) Applicant: AGC Inc., Tokyo (JP)

(72) Inventors: Shunji Ueda, Tokyo (JP); Kenichi Ebata, Tokyo (JP); Yuta Akashi, Tokyo (JP)

(73) Assignee: AGC INC., Tokyo (JP)

( * ) Notice: Subject to any disclaimer, the term of this patent is extended or adjusted under 35 U.S.C. 154(b) by 246 days.

(21) Appl. No.: 18/528,287

(22) Filed: Dec. 4, 2023

(65) Prior Publication Data

US 2024/0100915 A1 Mar. 28, 2024

Related U.S. Application Data

(63) Continuation of application No. PCT/JP2022/022976, filed on Jun. 7, 2022.

(30) Foreign Application Priority Data

Jun. 10, 2021 (JP) ................................ 2021-097651

(51) Int. Cl.

*B60J 1/20* (2006.01)
*B29C 65/14* (2006.01)
*B29C 65/48* (2006.01)
*B60R 1/04* (2006.01)

(52) U.S. Cl.

CPC ............. *B60J 1/20* (2013.01); *B29C 65/1416* (2013.01); *B29C 65/4815* (2013.01); *B60R 1/04* (2013.01)

(58) Field of Classification Search

CPC .... B29C 65/1412; B29C 65/1416; B60R 1/04
See application file for complete search history.

(56) References Cited

U.S. PATENT DOCUMENTS 5,064,494 A * 11/1991 Duck .................. B29C 65/1496 219/679
5,667,896 A * 9/1997 Carter ...................... B60J 10/30 248/467
5,853,895 A * 12/1998 Lewno .................. B60J 1/1853 427/372.2
5,864,996 A * 2/1999 Veldman ................. B60J 10/70 52/204.597

(Continued)

FOREIGN PATENT DOCUMENTS

FR 2699165 A1 * 6/1994 ........... C03C 27/048
JP 2007-216880 A 8/2007

(Continued)

OTHER PUBLICATIONS

Machine translation of FR2699165 (Year: 1994).*

(Continued)

*Primary Examiner* — Scott W Dodds
(74) *Attorney, Agent, or Firm* — Foley & Lardner LLP

(57) ABSTRACT

A method of producing metal component-attached vehicle window glass includes disposing a metal component on a main surface of window glass via an adhesive, locally heating the metal component, and transferring heat from the metal component to the adhesive to heat and cure the adhesive.

5 Claims, 3 Drawing Sheets

(56) References Cited

U.S. PATENT DOCUMENTS

| | | | | |
|---|---|---|---|---|
| 6,313,448 | B1 * | 11/2001 | Johnson | C09J 5/06 156/274.2 |
| 6,316,099 | B1 * | 11/2001 | George | B32B 7/12 428/413 |
| 2016/0297169 | A1 | 10/2016 | Notsu et al. | |
| 2017/0232663 | A1 | 8/2017 | Yamamoto et al. | |
| 2020/0047595 | A1 * | 2/2020 | Huotari | C09J 5/06 |
| 2020/0239358 | A1 | 7/2020 | Urata et al. | |
| 2020/0290334 | A1 | 9/2020 | Yamamoto et al. | |

FOREIGN PATENT DOCUMENTS

| | | | |
|---|---|---|---|
| JP | 2015-000821 | A | 1/2015 |
| JP | 2015-105356 | A | 6/2015 |
| JP | 2016-055741 | A | 4/2016 |
| JP | 2016-199457 | A | 12/2016 |
| JP | 6065221 | B2 | 1/2017 |
| JP | 6187818 | B2 | 8/2017 |
| JP | 2017-165608 | A | 9/2017 |
| JP | 6640612 | B2 | 2/2020 |
| JP | 2020-116876 | A | 8/2020 |
| JP | 2021-086082 | A | 6/2021 |

OTHER PUBLICATIONS

International Searching Authority, "International Search Report," issued in connection with International Patent Application No. PCT/JP2022/022976, dated Aug. 30, 2022.

International Searching Authority, "Written Opinion," issued in connection with International Patent Application No. PCT/JP2022/022976, dated Aug. 30, 2022.

* cited by examiner 80
85
81
30
20
10
11
15
12
II
II

METHOD OF PRODUCING METAL COMPONENT-ATTACHED VEHICLE WINDOW

CROSS-REFERENCE TO RELATED APPLICATIONS

This application is a continuation of International Application PCT/JP2022/022976, filed on Jun. 7, 2022 and designated the U.S., which is based on and claims priority to Japanese patent application No. 2021-097651 filed on Jun. 10, 2021, with the Japanese Patent Office. The entire contents of these applications are incorporated herein by reference.

BACKGROUND OF THE INVENTION

1. Field of the Invention

The present disclosure relates to a method of producing metal component-attached vehicle window glass.

2. Description of the Related Art

A configuration in which a component such as a mirror base or a bracket is bonded to the main surface of vehicle window glass with an adhesive is known. Production of such component-attached vehicle window glass generally includes a curing process for sufficiently curing the adhesive after the component is attached to the vehicle window glass via the adhesive.

Various methods have been studied to shorten the time of the curing process. For example, Patent Document 1 (Japanese Patent Application Laid-Open No. 2016-55741) describes a method in which an adherend and an adhesive surface of automobile glass are bonded to each other using an adhesive, and the adhesive is then cured using a superheated steam generator.

Patent Document 1 describes that as an effect of the disclosure, an adhesive can be cured in a short time without requiring a large-scale apparatus. However, the superheated steam furnace described in Patent Document 1 needs to have a size sufficient to cover the entire adherend, and requires devices such as a boiler and a heater in addition to the furnace. Therefore, unfortunately, the equipment in the related art is still large and complex. Furthermore, since it is necessary to blow high-temperature steam to cure the adhesive, there are concerns about positional deviation, deformation of the adhesive, and the like, when a small component is bonded.

SUMMARY

According to an aspect of the present disclosure, a method of producing metal component-attached vehicle window glass includes disposing a metal component on a main surface of window glass via an adhesive, locally heating the metal component, and transferring heat from the metal component to the adhesive to heat and cure the adhesive.

DESCRIPTION OF THE PREFERRED EMBODIMENT

Figure 1:
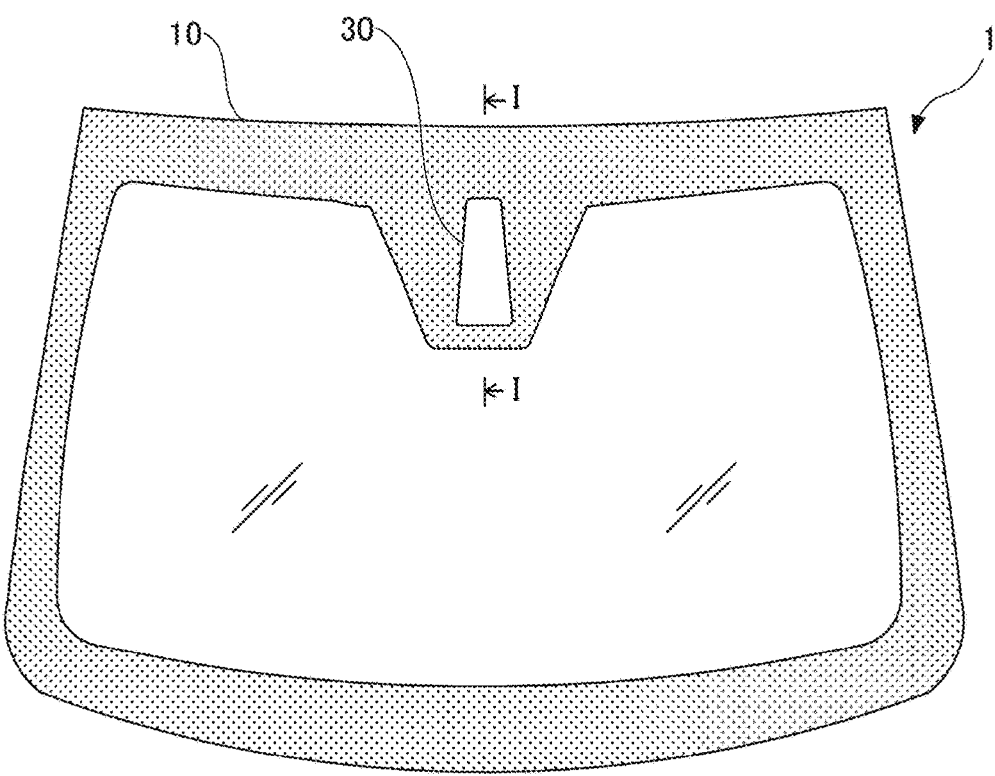
FIG. 1 illustrates an example of component-attached vehicle window glass according to an embodiment of the present disclosure.

In view of the above-mentioned problem, an object of the present disclosure is to provide a method capable of producing component-attached vehicle window glass in a short time and in a space-saving manner.

Hereinafter, an embodiment of the present disclosure will be described with reference to the drawings. In the drawings, the same or corresponding components are denoted by the same reference numerals, and description thereof may be omitted.

Figure 2:
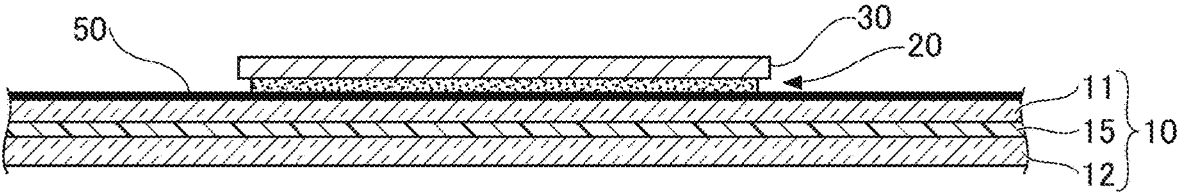
FIG. 2 is an enlarged cross-sectional view taken along line I-I in FIG. 1.

FIG. 1 is a diagram of an example of a metal component-attached vehicle window glass 1 produced according to the present embodiment as viewed from a vehicle-interior surface side. FIG. 2 is a partially enlarged cross-sectional view taken along line I-I in FIG. 1. As illustrated in FIG. 1 and FIG. 2, a metal component 30 is bonded to the main surface of a vehicle window glass 10, and an adhesive 20 is used for the bonding. In the illustrated example, the metal component 30 is a mirror base, and the mirror base is bonded to an upper portion and in the vicinity of the center in the left-right direction on the vehicle-interior surface of the vehicle window glass 10 (FIG. 1). Although the vehicle window glass 10 in FIG. 1 is a windshield, the vehicle window glass in the present embodiment may be a rear glass, a side glass, a roof glass, or the like.

As the vehicle window glass 10 used in the present embodiment, a glass plate made of soda lime silicate glass, aluminosilicate glass, borate glass, lithium aluminosilicate glass, borosilicate glass, or the like may be used. The process of forming the glass plate is not particularly limited, however, the glass plate is preferably a glass plate formed by a float process, for example. The glass plate may be non-tempered glass, or may be tempered glass which is being subjected to a tempering treatment such as an air-cooled tempering treatment or a chemically tempering treatment. The non-tempered glass is obtained by forming molten glass into a plate shape and annealing. The tempered glass is obtained by forming a compressive stress layer on the surface of non-tempered glass. In a case where the tempered glass is air-cooled tempered glass, the glass surface may be tempered by rapidly cooling the heated glass plate from the temperature near the softening point to generate compressive stress on the glass surface due to a temperature difference between the glass surface and the inside of the glass. In a case where the tempered glass is chemically tempered glass, the glass surface may be tempered by generating the compressive stress on the glass surface by an ion exchange method or the like. Furthermore, the vehicle window glass is preferably transparent, however, the glass may be colored to such an extent that the transparency is not impaired. The shape of the glass is not particularly limited to a rectangular shape, and may be processed into various shapes. The glass plate used for the vehicle window glass may be bent and curved. Gravity bending, press bending, or the like is used as the bending.

The vehicle window glass 10 may be a single plate glass or laminated glass. The laminated glass is glass obtained by bonding glass plates 11 and 12 via an intermediate film 15 (FIG. 2). The glass plates used for the laminated glass uses the above-described glass.

In the laminated glass, the material of the intermediate film 15 (FIG. 2) disposed between the glass plates 11 and 12 is not particularly limited, however, it is preferably a thermoplastic resin. Specific examples of the material of the intermediate film include a conventionally used thermoplastic resin such as a plasticized polyvinyl acetal-based resin, a plasticized polyvinyl chloride-based resin, a saturated polyester-based resin, a plasticized saturated polyester-based resin, a polyurethane-based resin, a plasticized polyurethane-based resin, an ethylene-vinyl acetate copolymer-based resin, an ethylene-ethyl acrylate copolymer-based resin, a cycloolefin polymer resin, an ionomer resin, and the like. A resin composition containing a modified block copolymer hydride described in Japanese Patent No. 6065221 can also be suitably employed. Among the above-described resins, the plasticized polyvinyl acetal-based resin is preferably used because of its excellence in terms of balance of performances, such as transparency, weather resistance, strength, bond strength, resistance to penetration, absorbability for impact energy, humidity resistance, thermal insulating property, and sound insulating property. The above-described thermoplastic resin may be used singly, or two or more types of thermoplastic resins may be used in combination. The term "plasticized" in the above-described plasticized polyvinyl acetal-based resin means that the resin is plasticized by adding a plasticizing agent. The same applies to the other plasticized resins.

The intermediate film may be a resin not containing a plasticizer, for example, an ethylene-vinyl acetate copolymer resin. The above-described polyvinyl acetal-based resin may include, for example, polyvinyl formal resin that is obtained by reacting polyvinyl alcohol (PVA) and formaldehyde, narrowly defined polyvinyl acetal-based resin that is obtained by reacting PVA and an acetaldehyde, polyvinyl butyral resin (PVB) that is obtained by reacting PVA and n-butyl aldehyde, and the like. Especially, PVB is preferable, because of its excellence in terms of balance of performances, such as transparency, weather resistance, strength, bond strength, resistance to penetration, absorbability for impact energy, humidity resistance, thermal insulating property, and sound insulating property. The above-mentioned resins may be used singly, or two or more types of polyvinyl acetal-based resins may be used in combination.

In the case of laminated glass, the entire vehicle window glass (including the intermediate film) may be between 2.3 mm and 8.0 mm, inclusive. The thicknesses of the glass plates constituting the laminated glass may be between 0.5 mm and 3.5 mm, inclusive. The thicknesses of the glass plates may be the same as or different from each other. The thickness of the vehicle-interior side glass plate may be between 0.5 mm and 2.3 mm, inclusive.

On the other hand, the metal component 30 is not particularly limited as long as it is a metal component that is attached to any location on the main surface of the vehicle window glass 10. The metal component 30 may be a mirror base (FIG. 1) for mounting an inner mirror, a bracket for mounting a sensor, a camera, or the like, a molding, a protector, a pin, a holder, a hinge, or the like. The metal constituting the metal component 30 may be a single metal composed of one kind of metal element or may be an alloy. The metal constituting the metal component 30 may be, for example, aluminum, zinc, iron, stainless steel, or the like.

The metal component 30 may be directly bonded to the main surface of the glass plate of the vehicle window glass, or may be bonded in contact with a shielding layer 50 formed on the vehicle window glass (FIG. 1). The shielding layer is a layer provided along the peripheral edge portion of the vehicle window glass 10 and formed by applying a ceramic paste (glass paste) colored in black, gray, or dark brown, and firing the paste. The shielding layer 50 has a function of protecting a sealant or the like that bonds the vehicle window glass to a vehicle body and holds the glass from ultraviolet rays or the like. Note that in a case where the window glass is the laminated glass, the shielding layer may be provided on at least one of a vehicle-interior side surface (a surface in contact with the intermediate film) of the vehicle-exterior side glass plate and a vehicle-interior side surface of the vehicle-interior side glass plate.

The adhesive used in the present embodiment is not particularly limited as long as it is an adhesive used for bonding the window glass and the metal component, and may be an epoxy-based adhesive, a urethane-based adhesive, a silicone-based adhesive, a modified silicone-based adhesive, a melamine-based adhesive, a phenol-based adhesive, an acrylic-based adhesive, or the like. It may be a one-component type or a two-component type. The adhesive is preferably an adhesive whose curing is accelerated by heating, that is, a heat-triggered adhesive (an adhesive whose curing is accelerated by heating such as a thermal cation or a thermal radical), or an adhesive containing a thermosetting polymer as a main component. The adhesive may be a heat-curable adhesive (an adhesive that requires heating in a normal use mode) or a room-temperature-curable adhesive (an adhesive that is cured by being left in a normal use mode and does not require heating). In the method according to the present embodiment, however, the room-temperature-curable adhesive can be suitably used. Specific examples of the adhesive include a modified silicone/epoxy adhesive, a two-component urethane adhesive, a one-component thermosetting urethane adhesive, and a second generation acrylic adhesive (SGA).

The present embodiment is a method of producing the metal component-attached vehicle window glass 1 as illustrated in FIG. 1 and FIG. 2, in which the metal component 30 is locally heated when the metal component 30 is bonded to the main surface of the vehicle window glass 10 with the adhesive 20. In the present specification, locally heating a predetermined component means not heating the entire structure combined with the predetermined component but locally increasing the temperature of the predetermined component. For example, in a case where the temperatures of the predetermined component and the other components of the structure are measured upon heating, the temperature of the predetermined component rises first or the temperature rising speed of the predetermined component is faster. Accordingly, in order to locally heat the metal component 30, for example, the metal component 30 can be locally heated by causing a heating device to face the metal component 30 or bringing the heating device into contact with the metal component 30.

In the present embodiment, the adhesive is indirectly heated by locally heating the metal component and the adhesive is then cured, thereby exhibiting the adhesive function of the adhesive. In the method according to the present embodiment, the metal component is disposed on a part of the main surface of the window glass via the adhesive, and the metal component is then heated. In this method, since heating is not performed by heating the entire structure by heating the atmosphere in which the structure in which the metal component is disposed on the main surface of the window glass via the adhesive is placed, or the like, a housing or the like for covering the metal component is not required, for example. Furthermore, in order to increase the temperature of the atmosphere having a relatively large volume in the housing, a large-scale heating device may be required. In the present embodiment, such a large-scale device is, however, not required, and the device for producing the vehicle window glass described above can be made compact and the production cost can be suppressed.

Furthermore, according to the present embodiment in which the adhesive is heated by locally heating the metal component, since the metal component has high thermal conductivity, the temperature of the adhesive can be raised in a short time. Therefore, the time required for rising the temperature of the adhesive to a target temperature (target temperature) can be shortened, and thus the producing efficiency of the metal component-attached vehicle window glass can be improved. Also, since the temperature rise of the portions other than the adhesive is suppressed, the portions other than the adhesive can be prevented from being damaged by heating.

The heating according to the present embodiment is preferably performed in a windless state. As used herein, the term “windless” means that no device which generates a flow of air or other gases (including steam) impinging on the structure including the window glass 10 and the metal component 30 disposed via the adhesive 20 is provided. By performing windless heating, positional deviation can be prevented in the attachment of a small component, and there is no or little change in the shape of the adhesive, and versatility is high.

Figure 3:
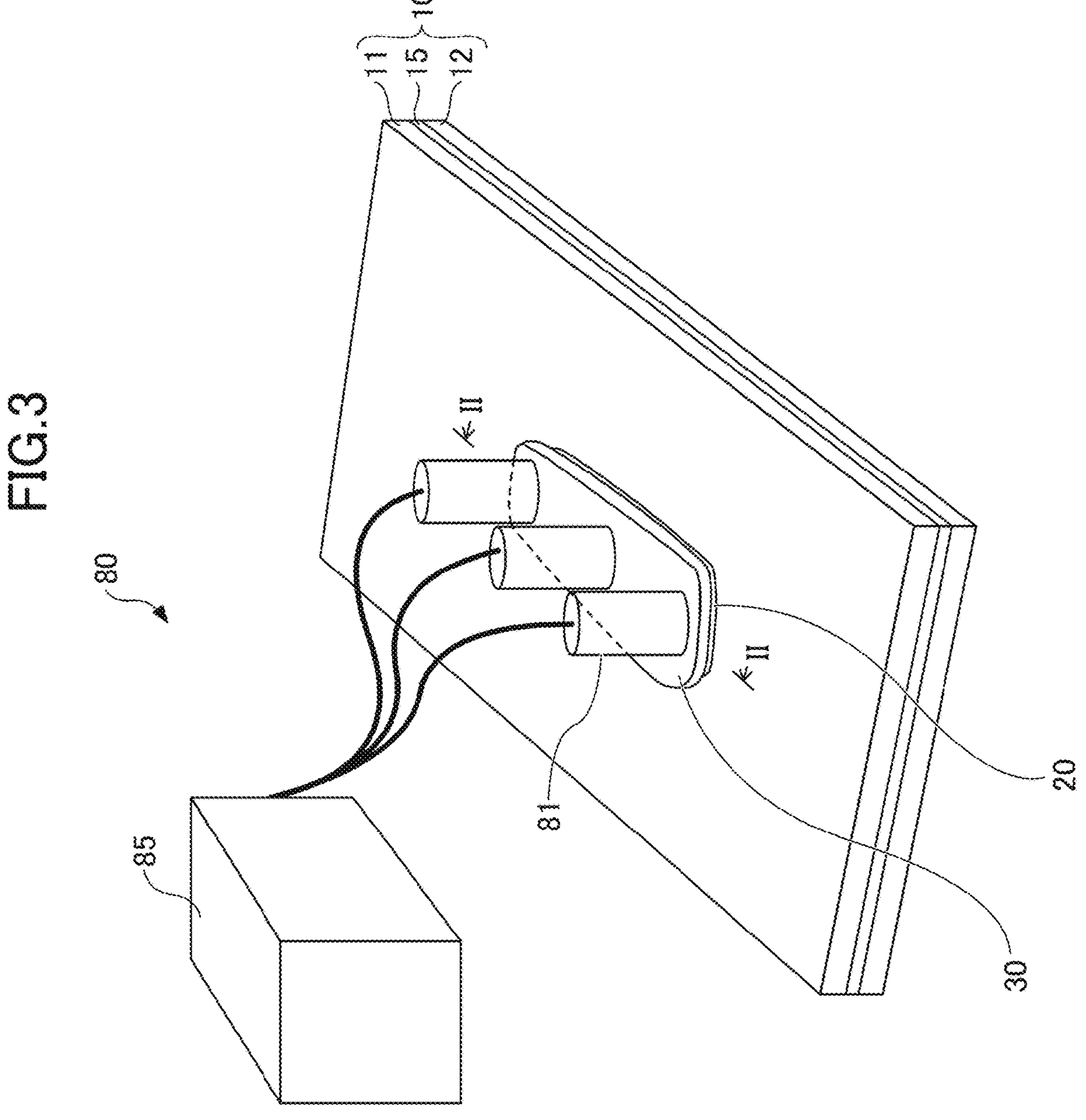
FIG. 3 is a diagram illustrating an example of a heating process in the production of the component-attached vehicle window glass according to the embodiment of the present disclosure.
Figure 4:
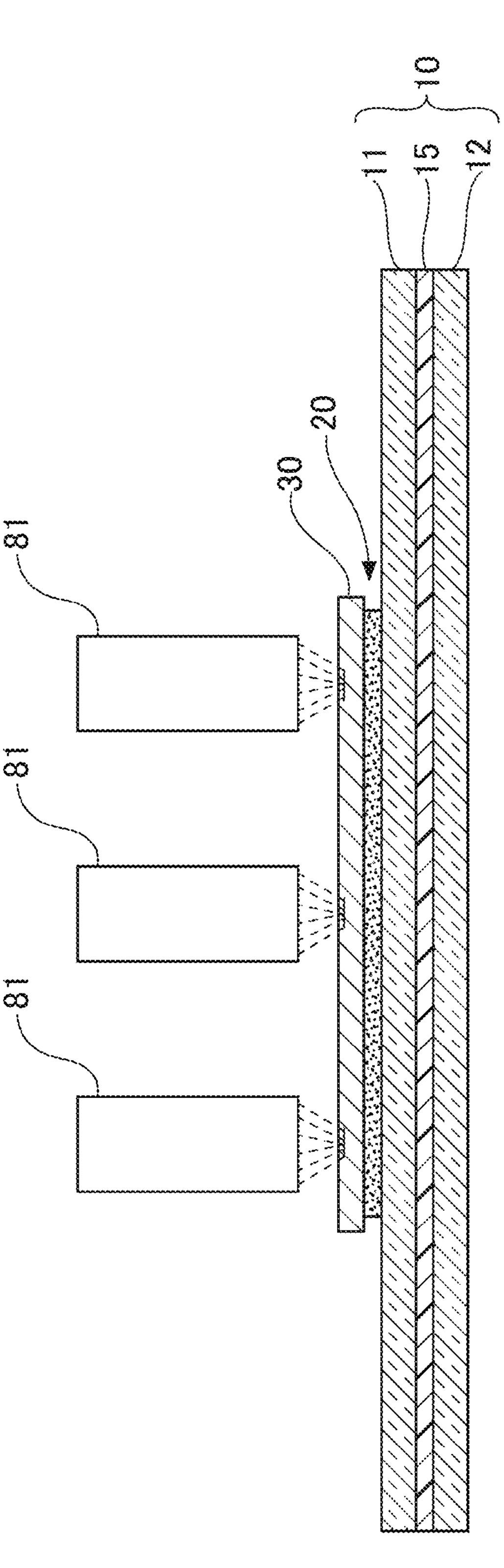
FIG. 4 is a partial cross-sectional view taken along line II-II in FIG. 3.

FIG. 3 schematically illustrates an example of a heating device used for heating in the producing method according to the present embodiment. FIG. 4 is a cross-sectional view taken along line II-II in FIG. 3.

In the producing method according to the present embodiment, first, the metal component 30 is disposed on the main surface of the window glass 10 via the adhesive 20. At this time, the adhesive may be applied to the entire bonding surface (the surface facing the window glass 10) of the metal component 30 or may be partially applied. The thickness of the adhesive 20 is preferably between 0.1 mm and 4 mm, inclusive, before heating. Furthermore, a primer may be applied to the bonding surface of the metal component 30 as necessary before the metal component 30 and the adhesive 20 are brought into contact with each other, and a primer may be applied to the bonding surface of the window glass 10 as necessary before the window glass 10 and the adhesive 20 are brought into contact with each other.

For the local heating of the metal component 30, heat transfer by radiation, by conduction, or by radiation and conduction is preferably used. Above all, heat transfer by irradiating an electromagnetic wave having a predetermined wavelength is preferable. It is because heating can be performed in a non-contact manner with respect to a component, and it can be applied to a component having a complicated surface shape. In a case where the heating device is a halogen lamp heater (halogen point heater, halogen line heater, for example) for heating by irradiating a near infrared ray (wavelength between 780 nm and 2500 nm, inclusive), since the electromagnetic energy is absorbed well by the metals, the metal component can be heated in a concentrated manner, and the portions other than the metal component can be prevented from being damaged by heating. Note that induction heat, laser heat, hot air, or the like can also be used for heating according to the present embodiment.

Although the heating method in the present embodiment does not exclude the use of hot water or steam, heating can be efficiently performed without using hot water or steam. Therefore, a drying step or the like is not required, and the curing of the adhesive can be more easily advanced compared to a conventional method in which a portion including the adhesive is immersed in water or disposed in superheated steam.

In the example illustrated in FIG. 3 and FIG. 4, a halogen lamp heating device is illustrated as a heating device 80. The halogen lamp heating device may include one or more halogen lamp heater main bodies 81 and a power supply and control part 85. As illustrated in FIG. 3 and FIG. 4, in a case where the area to which the adhesive 20 has been applied is large, it is preferable to provide multiple heater bodies because the entire adhesive can be more uniformly heated.

In the case of the halogen point heater, it is preferable to use a halogen point heater having a diameter between 10 mm and 100 mm, inclusive, and a focal point diameter between 1 mm and 5 mm, inclusive. Furthermore, the heater is preferably installed such that the focal point is located on the surface of the metal component 30 or inside thereof.

When the metal component 30 is heated and the temperature of the component rises, the heat in the metal is conducted by thermal conduction to the adhesive 20 which is placed in contact with the metal. Heating by the heating device may start on the exposed surface side (the surface opposite to the adhesive 20) of the metal component 30. However, since metal has high thermal conductivity, heat from the metal component can be rapidly conducted to the adhesive 20. As a result, the temperature of the adhesive 20 rises, and the curing speed can be increased.

The local heating of the metal component in the present embodiment can be performed such that the temperature of the adhesive reaches a target temperature for curing the adhesive (target curing temperature). Here, the target curing temperature can be determined depending on the type of the adhesive, the type of the metal component, the configuration of the vehicle window glass, the desired curing degree of the adhesive, and the like. The target curing temperature may be determined, for example, by measuring the gelation time of the adhesive at multiple temperatures. The target curing temperature of the adhesive is a temperature higher than room temperature (i.e., 15 to 25° C.), and may be, for example, between 40° C. and 100° C., inclusive.

Furthermore, even in a case where the vehicle window glass is laminated glass, the heating of the metal component according to the present embodiment can be performed without causing denaturation (foaming, discoloration, deformation, or the like) of the intermediate film. For example, heating according to the present embodiment can be performed at a temperature of the intermediate film of less than or equal to 100° C., preferably less than or equal to 80° C., and more preferably less than or equal to 50° C. Note that, in the conventional method of heating the bonding portion with superheated steam, portions other than the adhesive are also required to be heated in order to raise the temperature of the adhesive. Then, in the case where the window glass for a vehicle is laminated glass, the resin constituting the intermediate film may be denatured, or the air sealed inside the film may expand to cause damage thereto, which may cause problems such as foaming or peeling in the laminated glass, and discoloration of the intermediate film. On the other hand, in the method for locally heating the metal component as in the present embodiment, an excessive temperature rise of the intermediate film can be suppressed while the temperature of the adhesive is rapidly rising. Therefore, the component can be bonded in a short time without damaging the laminated glass.

Note that, in the heating according to the present embodiment, the temperature reached by the metal component 30 may be preferably less than or equal to 150° C., and more preferably 120° C. Furthermore, the temperature reached by the vehicle window glass (the surface of the glass plate or the shielding layer) during heating may be preferably less than or equal to 80° C., and more preferably less than or equal to 60° C.

In the present embodiment, the adhesive strength between the metallic component and the vehicle window glass is also sufficient. For example, the adhesive strength of equal to or greater than 1.0 MPa can be realized by a measurement method according to a tensile adhesive strength test (JIS K 6849). Furthermore, a good cohesive failure ratio (CF ratio) of equal to or greater than 90% can be realized by an evaluation method according to the tensile adhesive strength test (JIS K 6849).

EXAMPLES

Hereinafter, the embodiment of the present disclosure will be described in more detail based on examples. In the examples, under various conditions, a component was bonded to a main surface of window glass with an adhesive to produce component-attached automobile window glass.

In the present examples, measurement and evaluation were performed as follows.

<Determination of Target Curing Temperature (Target Value) of Adhesive>

The target curing temperature is a desired temperature to be reached by the adhesive which is heated in the curing step. In a case where the temperature of the adhesive is raised to a high temperature in a short time, there is a concern that decomposition of the adhesive may occur. Whereas, in a case where the adhesive is heated at a low temperature, there is a possibility that a sufficient degree of curing cannot be obtained and the performance of the adhesive cannot be exhibited. It is also required that the target temperature is determined in consideration of the heat resistance of the adherend. In the examples, the gelation time was measured at multiple temperatures for each adhesive to be used, and the gelation temperature which is the highest temperature in a temperature range in which the adhesive or the adherend is not damaged was set as the curing target value. The gelation time was measured by a method according to the gelation time A method in JIS K 6910:2007.

<Appearance Evaluation>

Each state of the component, the adhesive, and the laminated glass were evaluated by visual observation. If there was a change in either color, shape, or both compared to the state before the start of heating, the change was recorded as “discolored (including burnt)”, “deformed”, or the like. If there was no change in either color, shape, or both compared to the state before the start of heating, it was evaluated as “good”.

<Curing Time>

The time from the start of heating (from the start of operation of the heating device) until the adhesive reached the above-described target curing temperature was recorded.

<Adhesion Evaluation>

(Strength)

One hour after the end of heating, the strength was measured by a method in accordance with the tensile adhesive strength test (JIS K 6849). Note that, in the case of an example in which heating was not performed (Example 9), the strength was measured one hour after the component was disposed on the window glass via the adhesive.

(CF Ratio After Hot Water Test)

After complete curing, the component was immersed in hot water at 40° C. for 240 hours. Thereafter, evaluation was performed by the tensile adhesive strength test (JIS K 6849). The state of failure was visually observed, and the ratio of the area where the adhesive underwent cohesive failure with respect to the area to which the adhesive had been applied was taken as the cohesive failure ratio (CF ratio in %). Note that a CF ratio of 0% is a state in which the adhesive does not undergo cohesive failure at all but interfacial peeling occurs, and a CF ratio of 100% is a state in which the adhesive undergoes cohesive failure over the entire surface to which the adhesive had been applied. The higher the CF ratio, the greater the rate of occurrence of cohesive failure in the adhesive, and thus the adhesion between the component and the adhesive was better.

Example 1

A sample (100 mm×100 mm) of laminated glass was prepared by bonding two glass plates having a thickness of 2 mm to each other via a polyvinyl butyral intermediate film (0.73 mm). A shielding layer formed by firing a ceramic paste was formed on one surface of the laminated glass sample. A total of 1.1 g of a two-component silicone/epoxy adhesive (“MOS400” produced by Konishi Co., Ltd.) was applied to the entire bonding surface of a stainless steel mirror base (length: 700 mm, maximum width: 250 mm, area of bonding surface: approximately 950 mm 2), and the surface coated with the adhesive was placed on the surface of the laminated glass sample on which the shielding layer was formed. At this time, the adhesive sandwiched between the mirror base and the laminated glass was made to be 1.0 mm thick. Note that the bonding surface area of the mirror base (component) is an area of a flat surface on a side facing the main surface of the window glass.

As a heating device, a device provided with three halogen point heaters (near-infrared heaters, “HSH-18” produced by Fintech Co., Ltd.) having an opening diameter of 18 mm was used. The heaters were arranged so as to be spaced apart from each other in the longitudinal direction of the mirror base, and such that the irradiation ports of the heaters were opposite the surface of the mirror base opposite the bonding surface. At this time, the halogen point heater was arranged such that the distance from the opening of the heater to the opposing surface of the mirror base was 3 mm. The focal distance was 9 mm and the focal diameter was 2.5 mm. The halogen point heater was operated under the conditions of the power of 50% to 90% and the irradiation time of 30 seconds to 60 seconds. Heating by the heating device was performed until the temperature of the adhesive reached a target curing temperature while measuring the temperature of the adhesive, the temperature of the shielding layer formed on the laminated glass, and the temperature of the intermediate film. After heating, for the component-attached laminated glass (component-attached automobile window glass) obtained in each example, the adhesive strength of the adhered portion and the CF ratio after the hot water test were determined.

Example 2

In the same manner as in Example 1 except that the mirror base was replaced with the mirror base made of aluminum (the size and shape of the mirror base were also the same as in Example 1), the component (mirror base) was disposed on the shielding layer of the laminated glass via the adhesive, and heating was performed with the halogen point heaters.

Example 3

In the same manner as in Example 1 except that the mirror base was replaced with the mirror base made of zinc (the size and shape of the mirror base were also the same as in Example 1), the component (mirror base) was disposed on the shielding layer of the laminated glass via the adhesive, and heating was performed with the halogen point heaters.

Example 4

Instead of the mirror base, a sensor bracket made of iron (length in the longitudinal direction: 74 mm, length in the widthwise direction: 3.8 mm, area of the bonding surface: 320 mm 2) was used as a component. Note that the area of the bonding surface of the sensor bracket (component) is an area of a flat surface on a side facing the main surface of the window glass. The same two-component silicone/epoxy adhesive as in Example 1 was applied to the entire bonding surface of the sensor bracket, and the sensor bracket was disposed on the laminated glass as in Example 1. The adhesive was made to be 0.6 mm thick.

As the heating device, a device provided with four halogen point heaters ("HSH-12" produced by Fintech Co., Ltd.) having an opening diameter of 12 mm was used. The heaters were arranged at the respective corners of a rectangular bracket such that the irradiation ports of the heaters were opposite the exposed surface (the surface opposite to the bonding surface) of the bracket. At this time, the halogen point heater was also disposed such that the distance from the opening of the heater to the facing surface of the bracket was the 3 mm. The focal distance was 6 mm and the focal diameter was 1.5 mm. The halogen point heater was operated under the conditions of the power of 70% and the irradiation time of 60 seconds.

Example 5

An experiment was performed in the same manner as in Example 1 except that the adhesive was replaced with a one-component thermosetting urethane adhesive ("Penguin Cement #8800" produced by Sunstar Inc.) and a primer ("SC-241" produced by Sunstar Inc.) was applied to the bonding surface of the glass before the adhesive was applied.

Example 6

An experiment was performed in the same manner as in Example 1 except that the adhesive was replaced with a two-component urethane adhesive ("Hysol-10FL" produced by Henkel Japan Ltd.) under the condition of the irradiation time of 90 seconds.

Example 7

An experiment was performed in the same manner as in Example 1 except that, as the heating device, an induction heater was used instead of the halogen point heaters. A coil portion of the induction heater ("iDuctor2" produced by NESSAN heat CORPORATION) was disposed on the outer periphery of the exposed surface of the mirror base (the surface opposite to the adhesive), and was operated under the conditions of the power of 70% and the heating time of 60 seconds.

Example 8

An experiment was performed in the same manner as in Example 1 except that a laser generator was used as the heating device instead of the halogen point heaters. The laser generator ("LD irradiation light source" produced by Hamamatsu Photonics K.K.) was adjusted under the conditions of the power of 30 W, the frequency of 940 nm, and the condensing diameter of 1.6 mm, and laser light was then emitted to the exposed surface of the mirror base.

Example 9

The same procedure as in Example 1 was followed except that no heating was performed. That is, the mirror base was disposed via the adhesive on the surface of the laminated glass sample on which the shielding layer was formed.

Example 10

An experiment was performed in the same manner as in Example 1 except that an oven was used as the heating device instead of the halogen point heaters. The mirror base was disposed via the adhesive on the surface of the laminated glass sample on which the shielding layer was formed, and was then placed in the oven ("PV-222" produced by ESPEC CORP.). The oven was operated at 90° C.

Example 11

An experiment was performed in the same manner as in Example 1 except that a far-infrared heater was used as the heating device instead of the halogen point heaters. More specifically, the heating surface of the far-infrared heater ("QFE-125" produced by Nippon Heater Co., Ltd.) was opposite the exposed surface of the mirror base with a 200 mm gap therebetween, and the heater was operated under the conditions of the power of 125 W and the heating time of 150 seconds.

Example 12

An experiment was performed in the same manner as in Example 4 except that a sensor bracket made of polybutylene terephthalate (PBT) was used instead of the sensor bracket made of iron. The size and shape of the sensor bracket used in this example was about the same as the sensor bracket used in Example 4.

Example 13

An experiment was performed in the same manner as in Example 4 except that a sensor bracket made of polyamide (PA) was used instead of the sensor bracket made of iron.

The size and shape of the sensor bracket used in this example was about the same as the sensor bracket used in Example 4.

Example 14

An experiment was performed in the same manner as in Example 4 except that a sensor bracket made of polycarbonate (PC) was used instead of the sensor bracket made of iron. The size and shape of the sensor bracket used in this example was about the same as the sensor bracket used in Example 4.

Table 1 and Table 2 illustrate the experimental conditions and results. Examples 1 to 8 are examples, and Examples 9 to 14 are comparative examples.

TABLE 1

| | | | Example 1 | Example 2 | Example 3 | Example 4 | Example 5 | Example 6 | Example 7 | Example 8 |
|---|---|---|---|---|---|---|---|---|---|---|
| Condition | Heating device | | Halogen lamp | Halogen lamp | Halogen lamp | Halogen lamp | Halogen lamp | Halogen lamp | Induction heater | Laser |
| | Adherend | Type | Mirror base | Mirror base | Mirror base | Sensor bracket | Mirror base | Mirror base | Mirror base | Mirror base |
| | | Material | Stainless steel | Aluminum | Zinc | Iron | Stainless steel | Stainless steel | Stainless steel | Stainless steel |
| | Adhesive | | Two-component silicone/epoxy | Two-component silicone/epoxy | Two-component silicone/epoxy | Two-component silicone/epoxy | One-component thermosetting urethane | Two-component urethane | Two-component silicone/epoxy | Two-component silicone/epoxy |
| | Target curing temperature (adhesive temperature) | | 90° C. | 90° C. | 90° C. | 90° C. | 80° C. | 50° C. | 90° C. | 90° C. |
| Evaluation | Temperature | Glass (shielding layer) | ≤60° C. | ≤60° C. | ≤60° C. | ≤60° C. | ≤50° C. | ≤30° C. | ≤60° C. | ≤60° C. |
| | | Intermediate film | ≤50° C. | ≤50° C. | ≤50° C. | ≤50° C. | ≤40° C. | ≤30° C. | ≤50° C. | ≤50° C. |
| | Appearance | Component | Good | Good | Good | Good | Good | Good | Good | Good |
| | | Adhesive | Good | Good | Good | Good | Good | Good | Good | Good |
| | | Laminated glass | Good | Good | Good | Good | Good | Good | Good | Good |
| | Curing time (time to reach target curing temperature) | | 60 seconds | 60 seconds | 60 seconds | 60 seconds | 60 seconds | 90 seconds | 60 seconds | 60 seconds |
| | Adhesion | Strength after 1 hour | 1.4 MPa | 1.3 MPa | 1.4 MPa | 0.9 MPa | 0.8 MPa | 0.9 MPa | 1.2 MPa | 1.3 MPa |
| | | CF ratio after hot water test | 100% | 100% | 100% | 100% | 100% | 100% | 100% | 100% |

TABLE 2

| | | | Example 9 | Example 10 | Example 11 | Example 12 | Example 13 | Example 14 |
|---|---|---|---|---|---|---|---|---|
| Condition | Heating device | | None | Oven | Infrared heater (flat surface heat) | Halogen lamp | Halogen lamp | Halogen lamp |
| | Adherend | Type | Mirror base | Mirror base | Mirror base | Sensor bracket | Sensor bracket | Sensor bracket |
| | | Material | Stainless steel | Stainless steel | Stainless steel | PBT | PA | PC |
| | Adhesive | | Two-component silicone/epoxy | Two-component silicone/epoxy | Two-component silicone/epoxy | Two-component silicone/epoxy | Two-component silicone/epoxy | Two-component silicone/epoxy |
| | Target curing temperature (adhesive temperature) | | 90° C. | 90° C. | 90° C. | 25° C. | 25° C. | 25° C. |
| Evaluation | Temperature | Glass (shielding layer) | Room temperature | 1° C. | 136° C. | n/a | n/a | n/a |
| | | Intermediate film | Room temperature | 88° C. | 128° C. | n/a | n/a | n/a |
| | Appearance | Component | Good | Good | Good | Burnt | Deformed resin | Burnt |
| | | Adhesive | Good | Good | Good | Good | Good | Good |
| | | Laminated glass | Good | Good | foamed | n/a | n/a | n/a |
| | Curing time (time to reach target curing temperature) | | Not reached | 20 minutes | 120 seconds | 60 seconds | 60 seconds | 60 seconds |
| | Adhesion | Strength after 1 hour | 0.3 MPa *1 | 1.3 MPa | n/a | n/a | n/a | n/a |
| | | CF ratio after hot water test | 100% | 100% | n/a | n/a | n/a | n/a |

*1 Strength measured 1 hour after the component is disposed on the window glass via the adhesive.

As illustrated in Table 1 and Table 2, in Examples 1 to 8 in which the adhesive was indirectly heated by locally heating the metal component, the temperature of the adhesive reached the desired temperature (target curing temperature) in a short time, and there was no damage to portions other than the adhesive, that is, the component itself and the laminated glass (particularly, the intermediate film). Furthermore, the adhesion of the component of the component-attached automobile window glass obtained in Examples 1 to 8 was also sufficient.

On the other hand, in Example 9 in which heating was not performed, the adhesion was evaluated after the same time as in Example 1, but the adhesion of the component was low. Furthermore, in the case of Examples 10 and 11 in which heating was performed but the component was not locally heated, it took time for the temperature of the adhesive to reach the desired temperature. In particular, in Example 11, it was found that the temperature of the intermediate film rose and the intermediate film foamed disadvantageously. In the case of Examples 12 to 14 in which the resin component was used instead of the metal component, it was found that the resin component itself was burnt or deformed by the method for locally heating the component as in the present embodiment.

Although the present disclosure has been described based on the embodiment and examples, the present disclosure is not limited to the embodiment and examples. Various changes, modifications, substitutions, additions, deletions, combinations, and the like can be made to the above-described embodiment within the scope described in the claims, and these also belong to the technical scope of the present disclosure.

According to an aspect of the present disclosure, a method capable of producing component-attached vehicle window glass can be provided in a short time and in a space-saving manner.

What is claimed is:

1. A method of producing metal component-attached vehicle window glass, the method comprising:

disposing a metal component on a main surface of a window glass via an adhesive;

then locally heating, by a near infrared heater, the metal component disposed on the window glass via the adhesive; and transferring heat from the locally heated metal component to the adhesive to heat and cure the adhesive, wherein the window glass is a laminated glass comprising a first glass plate, a second glass plate and an intermediate film between the first glass plate and the second plate, the first glass plate is bonded to the second glass plate via the intermediate film, and wherein the locally heating the metal component is performed in such a way that a temperature of the intermediate film does not exceed 100° C.

2. The method of producing metal component-attached vehicle window glass according to claim 1, wherein the heating of the metal component is performed in a windless state.

3. The method of producing metal component-attached vehicle window glass according to claim 1, wherein the metal component is a component for mounting an in-vehicle item.

4. The method of producing metal component-attached vehicle window glass according to claim 1, wherein the adhesive is an adhesive whose curing is accelerated by heating.

5. The method of producing metal component-attached vehicle window glass according to claim 1, wherein a shielding layer formed by firing a ceramic paste is provided on a peripheral edge portion of the vehicle window glass, and the metal component is bonded to the shielding layer.

* * * * *